United States Patent [19]

Okada et al.

[11] Patent Number: 5,258,841
[45] Date of Patent: Nov. 2, 1993

[54] HORIZONTAL SYNCHRONIZING SIGNAL SEPARATION CIRCUIT

[75] Inventors: Hisao Okada; Kuniaki Tanaka, both of Nara; Shigeyuki Uehira, Kashihara, all of Japan

[73] Assignee: Sharp Kabushiki Kaisha, Osaka, Japan

[21] Appl. No.: 742,034

[22] Filed: Aug. 8, 1991

[30] Foreign Application Priority Data

Aug. 8, 1990 [JP] Japan .................. 2-210609

[51] Int. Cl.⁵ .............................................. H04N 5/08
[52] U.S. Cl. .................................... 358/153; 358/154
[58] Field of Search ............... 358/148, 153, 154, 155, 358/158; 340/814

[56] References Cited

U.S. PATENT DOCUMENTS 4,963,969 10/1990 Kitaura ............................ 358/153
5,132,794 7/1992 Okada ............................. 358/153

FOREIGN PATENT DOCUMENTS 58-95483 7/1983 Japan .
58-121871 7/1983 Japan .
62-16682 1/1987 Japan .
2151422 7/1985 United Kingdom .

*Primary Examiner*—James J. Groody
*Assistant Examiner*—Sherrie Hsia

[57] ABSTRACT

In a horizontal synchronizing signal separation circuit, from a composite synchronizing signal which includes a horizontal synchronizing signal and a vertical synchronizing signal, a detection signal indicative of detection of a rising edge of the composite synchronizing signal is generated. A gate is provided through which the detection signal is passed in accordance with a control signal. The control signal is a pulse signal having a predetermined pulse width, which is generated by a circuit to which the output of the gate is input. The output of the gate is also supplied to another circuit which generates a separated horizontal synchronizing signal.

11 Claims, 6 Drawing Sheets

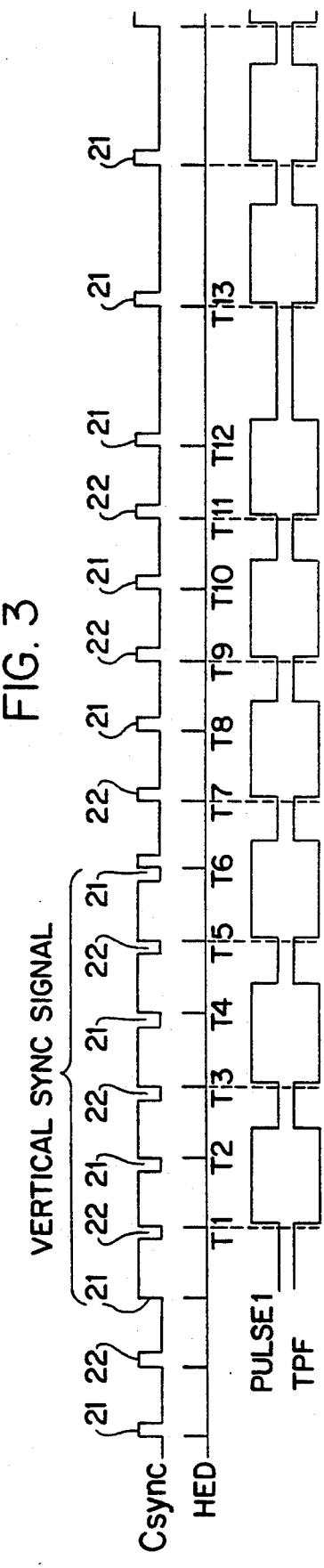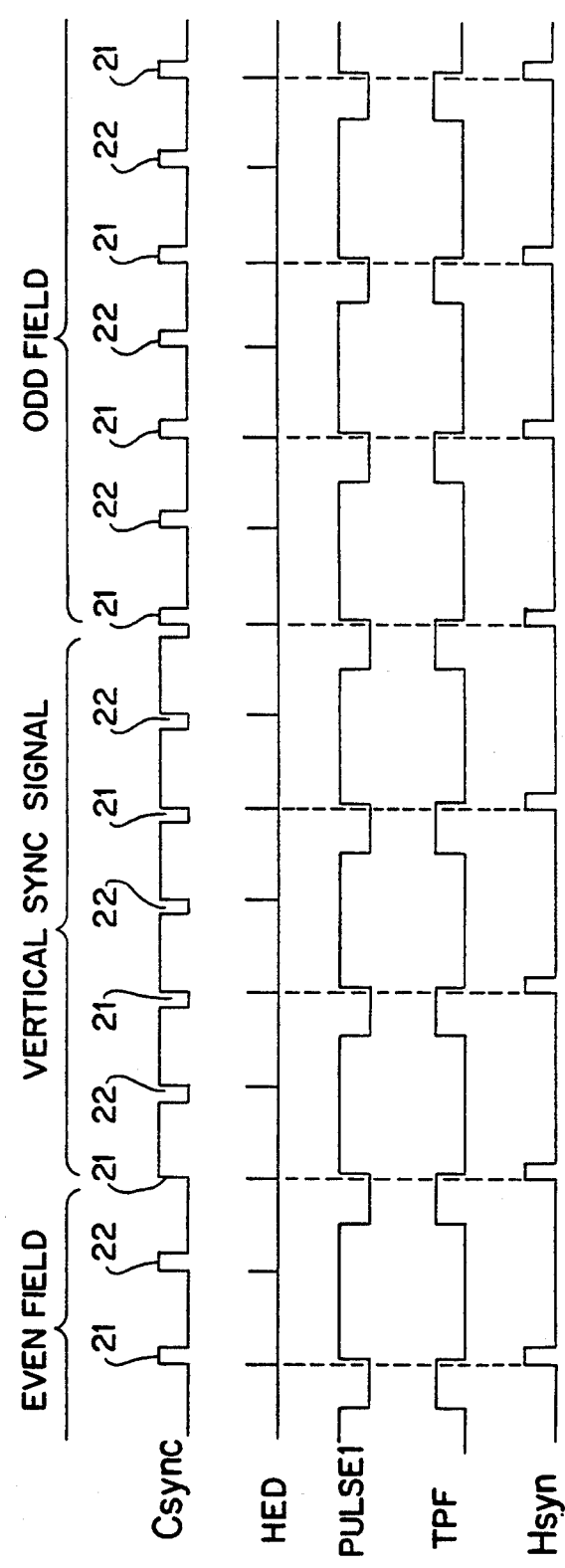

HORIZONTAL SYNCHRONIZING SIGNAL SEPARATION CIRCUIT

BACKGROUND OF THE INVENTION

1. Field of the Invention

The present invention relates to a horizontal synchronizing signal separation circuit, and more particularly to a horizontal synchronizing signal separation circuit for extracting the timing of a horizontal synchronizing signal from a composite synchronizing signal which includes a horizontal synchronizing signal and a vertical synchronizing signal. Hereinafter, the term "synchronizing signal" is abbreviated as "sync signal".

2. Description of the Background Art

- In a television system such as the NTSC (National Television System Committee) system or the PAL (Phase Alternation Line) system, only a composite sync signal in which a vertical sync signal and a horizontal sync signal are combined is supplied as a sync signal to a television apparatus.

In a matrix type liquid crystal display (LCD) apparatus widely used in recent years, a clock signal for sampling image signals in the LCD apparatus is generated. Since this clock signal must be precisely synchronous with the horizontal sync signal when the display is performed based on the image information in the above-mentioned television system, the clock signal is generated using a PLL (Phase-Locked Loop) circuit 100 as shown in FIG. 9. The PLL circuit 100 has a loop which comprises a voltage-controlled oscillator (VCO) 101, a frequency divider 102, a phase comparator 103 and a low-pass filter (LPF) 104. It is desirable to supply the horizontal sync signal as the sync signal Sync which is the input signal of the PLL circuit 100. In the prior art, however, the composite sync signal is supplied as it is.

FIGS. 10A to 10C show composite sync signals used in the NTSC system. FIG. 10A shows a composite sync signal in a transition period from an even field to an odd field. FIG. 10B shows a portion of a composite sync signal in one field. In FIG. 10C, a composite sync signal in a transition period from an odd field to an even field is illustrated. As shown in FIGS. 10A and 10C, in addition to the horizontal sync signal 21, a vertical sync signal and an equalizing pulse 22 exist in the composite sync signal in the transition period from one field to the next field. The equalizing pulse 22 is inserted to equalize the waveforms of the composite sync signal in the portion of the vertical sync signal and in the peripheral portion thereof, during the transition period from the even field to the odd field and during the transition period from the odd field to the even field. In the peripheral portion of the vertical sync signal, the width of the horizontal sync signal 21 and that of the equalizing pulse 22 are half as compared with that of the normal horizontal sync signal 21.

In the prior art, since such a composite sync signal is input to the PLL circuit 100 (FIG. 9) as it is, the phase relationship in the PLL circuit 100 is disturbed due to the presence of the vertical sync signal and equalizing pulse in the composite sync signal shown in FIGS. 10A and 10C. This disturbance causes the oscillation frequency of the VCO 101 to fluctuate. If this fluctuation in the oscillation frequency of the VCO 101 is not absorbed even when entering a display period during which image information for the display area is supplied to the LCD apparatus, a problem arises in that the resulting image is distorted.

In order to avoid the image distortion from occurring, it is necessary to absorb the fluctuation in the oscillation frequency of the VCO 101 during a period prior to the above display period (i.e., a vertical retrace line interval). This is a major hindrance in the simplification of the design of the PLL circuit for a matrix type display apparatus such as an LCD apparatus.

Further, in some prerecorded video tapes which are commercially available, an AGC (Auto Gain Control) signal for the luminance signal is purposely inserted in the composite video signal in order to destabilize the playback of video tapes produced by copying the prerecorded video tapes. In the playback of these video tapes, the AGC signal cannot be completely removed by a low-pass filter in the extraction of the composite sync signal from the composite video signal, and therefore, a pulse (which may be a spurious sync signal such as that shown in FIG. 11) in mixed in immediately after the vertical sync signal in the extracted composite sync signal. When a composite sync signal in which the spurious sync signal exists immediately before the display period as shown in FIG. 11 is input to the PLL circuit 100, it is practically impossible to stabilize the PLL circuit 100 which is disturbed by the spurious sync signal, before the display period. In order to solve this problem in the prior art, such measures as narrowing the area in which the image is actually displayed on the display screen are employed, but it was difficult to completely hide the image distortion appearing in the upper portion of the display screen, and satisfactory display can not be obtained in many cases.

SUMMARY OF THE INVENTION

The horizontal synchronizing signal separation circuit of this invention, which overcomes the above-discussed and numerous other disadvantages and deficiencies of the prior art, includes detection means for receiving a composite synchronizing signal which includes a horizontal synchronizing signal and a vertical synchronizing signal, and for generating a detection signal through an output, the detection signal being indicative of detection of a rising edge of the composite synchronizing signal; gate means, coupled to the output of the detection means, for receiving a control signal, and for passing the detection signal in accordance with the control signal; control signal generation means, coupled to an output of the gate means, for generating a pulse signal in accordance with the output of the gate means, the pulse signal having a predetermined pulse width and being supplied to the gate means as the control signal; and pulse signal generation means, coupled to the output of the gate means, for generating a further pulse signal which rises substantially at the timing when the detection signal passes the gate means, the further pulse signal being output as a separated horizontal synchronizing signal.

Preferably, the predetermined pulse width is longer than a half of one horizontal scanning period and shorter than one horizontal scanning period.

In a preferred embodiment, the control signal generation means includes a monostable multivibrator.

In a preferred embodiment, the control signal generation means further includes an inverter which is connected to an output of the multivibrator, the output of the inverter being output as the control signal.

In a preferred embodiment, the pulse signal generation means includes a monostable multivibrator.

Thus, the invention described herein makes possible the objective of providing a horizontal sync signal separation circuit which can correctly extract the timing of a horizontal sync signal from a composite sync signal. Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

This invention may be better understood and its numerous objects and advantages will become apparent to those skilled in the art by reference to the accompanying drawings which are given by way of illustration only and thus are not limitative of the present invention, and wherein:

FIGS. 2 to 4 are timing charts illustrating the operation of the first embodiment.

DESCRIPTION OF THE PREFERRED EMBODIMENTS

Figure 1:
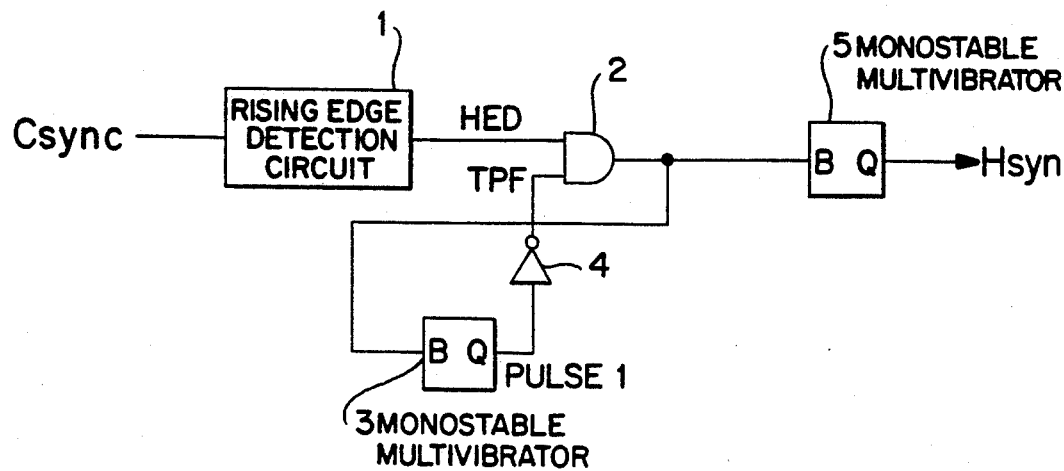
FIG. 1 is a block diagram showing a horizontal sync signal separation circuit in a first embodiment of the invention.
Figure 9:
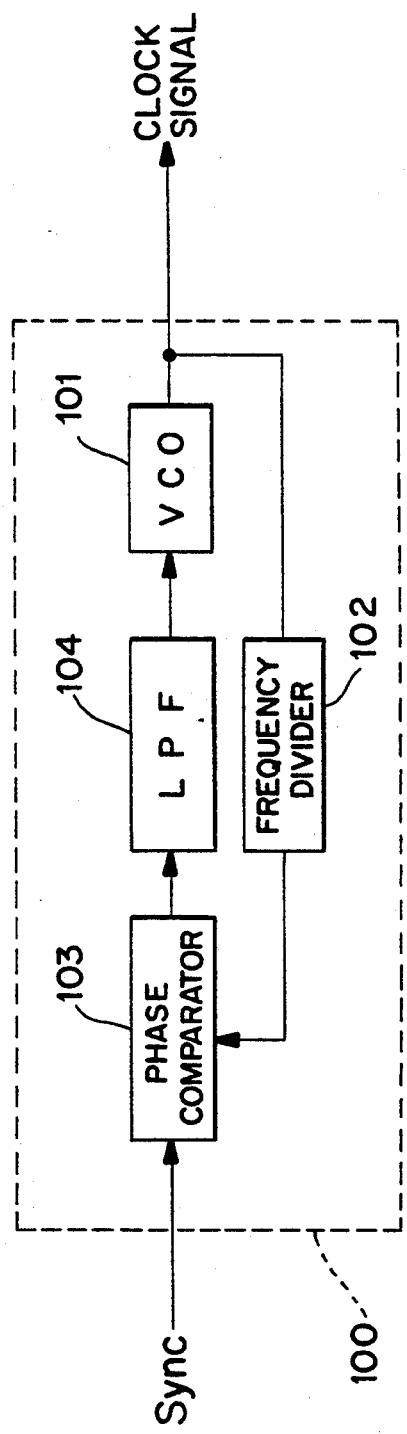
FIG. 9 is a block diagram showing a PLL circuit for generating a sampling clock signal used in a prior art LCD apparatus.
Figure 10A:
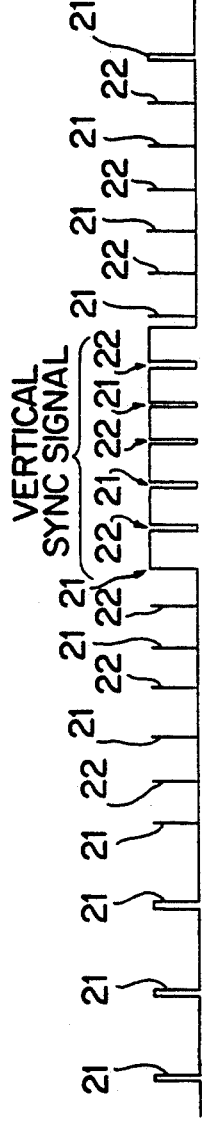
FIGS. 10A to 10C show composite sync signals used in the NTSC system.
Figure 10B:
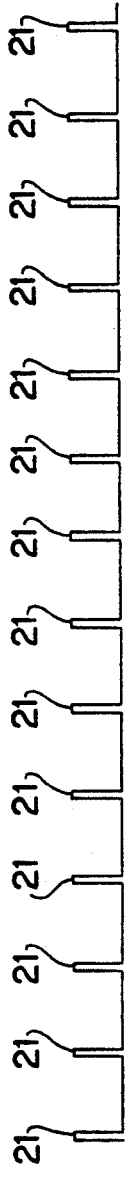
Figure 10C:
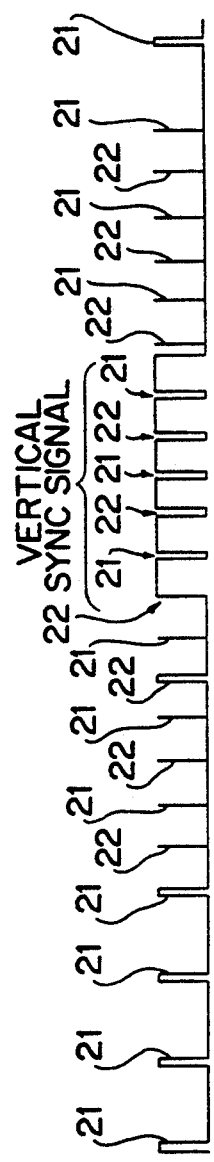

FIG. 1 is a block diagram of a first embodiment of the invention. A composite sync signal $C_{sync}$ is input to a rising edge detection circuit 1. Upon detection of the rising edge of the composite sync signal $C_{sync}$, the rising edge detection circuit 1 generates a pulse signal HED which is then supplied to an input terminal of an AND gate 2. A control signal TPF is input to the other input terminal of the AND gate 2, and the pulse signal HED passes through the AND gate 2 when the control signal TPF is HIGH. The pulse signal HED that has passed through the AND gate 2 is input to two monostable multivibrators 3 and 5. The monostable multivibrator 3 is triggered by the pulse signal HED that has passed through the AND gate 2 and generates a pulse PULSE1 with a predetermined pulse width. The pulse PULSE1 output from the monostable multivibrator 3 is logically inverted by an inverter 4, and the pulse output from the inverter 4 is supplied to the AND gate 2 as the control signal TPF. The monostable multivibrator 5 is triggered by the pulse signal HED that has passed through the AND gate 2 and generates a pulse with a predetermined pulse width. The pulse output from the monostable multivibrator 5 becomes the separated horizontal sync signal $H_{syn}$. The timing of the rising edges of the separated horizontal sync signal $H_{syn}$ is essentially the same as the timing of when the pulse signal HED passes through the AND gate 2. The separated horizontal sync signal $H_{syn}$ becomes an input signal for the PLL circuit 100 shown in FIG. 9.

Figure 2:
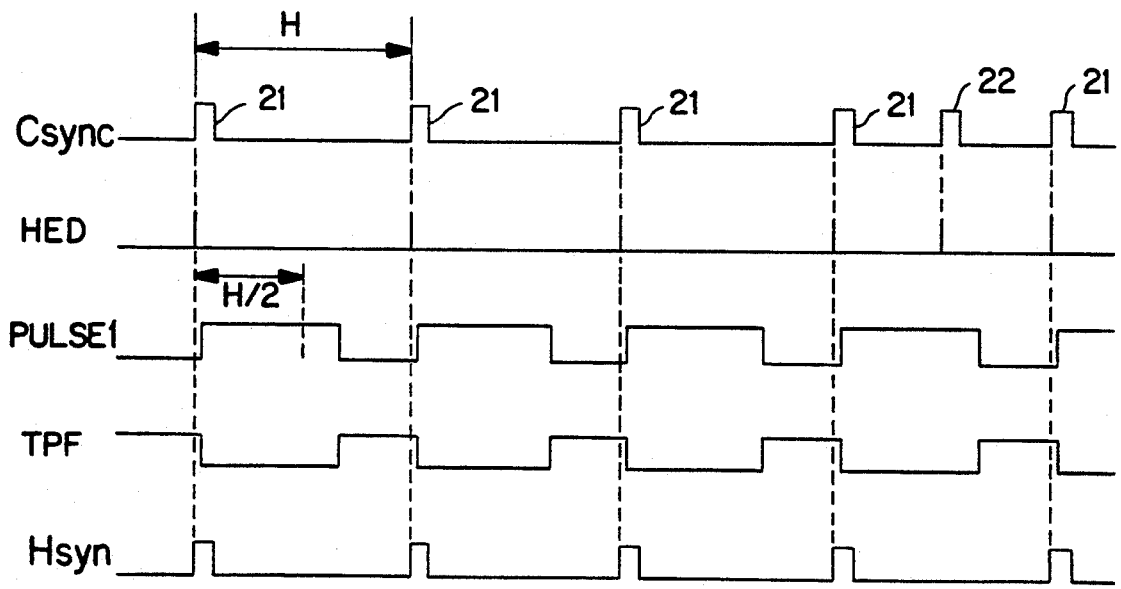

Next, the operation of this embodiment is described. The timing chart of FIG. 2 shows signals in various parts of the horizontal sync signal separation circuit in FIG. 1, where the separated horizontal sync signal $H_{syn}$ is synchronized with a horizontal sync signal 21 in the composite sync signal $C_{sync}$. The rising edge detection circuit 1 outputs the pulse signal HED at the rise of the composite sync signal $C_{sync}$. The pulse PULSE1 is output from the monostable multivibrator 3 in response to the pulse signal HED that has passed through the AND gate 2. The pulse width of the pulse PULSE1 is set to be longer than half (H/2) of the horizontal scanning period H and shorter than the horizontal scanning period H (H/2<PULSE1<H). The pulse PULSE1 is inverted by the inverter 4 and supplied to the AND gate 2 as the control signal TPF. The fall of the control signal TPF is slightly delayed behind the generation of the pulse signal HED due to the delay caused by the monostable multivibrator 3 and the inverter 4. Therefore, the control signal TPF is already HIGH when the pulse signal HED is input to the AND gate 2, thus allowing the pulse signal HED to pass through the AND gate 2. The separated horizontal sync signal $H_{syn}$ is output from the monostable multivibrator 5 in response to the pulse signal HED that has passed through the AND gate 2. The width of the signal $H_{syn}$ is set to be approximately equal to that of the horizontal sync signal 21.

Since the pulse width of the pulse PULSE1 is set as described above, the control signal TPF is LOW when the pulse signal HED corresponding to equalizing pulse 22 is generated. As a result, the pulse signal HED corresponding to the equalizing pulse 22 will not pass through the AND gate 2. Therefore, the signal $H_{syn}$ is not generated at the timing of the equalizing pulse 22, and the synchronizing condition between the separated horizontal sync signal $H_{syn}$ and the horizontal sync signal 21 is not disturbed by the equalizing pulse 22.

The process in which the horizontal sync signal separation circuit in FIG. 1 is synchronized with the horizontal sync signal 21 in the composite sync signal $C_{sync}$ is described by referring to FIG. 3. FIG. 3 shows the composite sync signal $C_{sync}$ which is in a transition period from an even field to an odd field. The output of the monostable multivibrator 3 is LOW in its initial state. As shown in FIG. 3, the pulse signal HED generated at timing T1 of the equalization pulse 22 in the vertical sync signal passes through the AND gate 2, so that the pulse PULSE1 is generated. The control signal TPF becomes LOW at this time, and therefore, the pulse signal HED generated at timing T2 of the next rising edge of the composite sync signal $C_{sync}$ (i.e., at the timing of the horizontal sync signal 21) cannot pass through the AND gate 2. Thereafter, the control signal TPF becomes HIGH as the pulse PULSE1 returns to LOW, and the pulse signal HED generated at timing T3 which is the timing of the equalization pulse 22 passes through the AND gate 2. The pulse PULSE1 is made HIGH again by this pulse signal HED. The same operation is repeated. Of the pulse signals HED corresponding to the timings of the rise of the composite sync signal $C_{sync}$, those at timings T5, T7, T9 and T11 pass through the AND gate 2, but those at timings T4, T6, T8, T10 and T12 do not pass through the AND gate 2. In the example of FIG. 3, the timings T5, T7, T9 and T11 are the timings of the equalization pulse 22, and the timings T4, T6, T8, T10 and T12 are the timings of the horizontal sync signal 21. Therefore, up to the timing T12, the horizontal sync signal separation circuit in FIG. 1 is not synchronous with the horizontal sync signal 21.

However, since the equalization pulse 22 does not exist after the timing T12, the control signal TPF remains HIGH until the timing T13. Therefore, the pulse signal HED corresponding to the horizontal sync signal 21 at the timing T13 passes through the AND gate 2, and the pulse PULSE1 is generated at that timing. Thereafter, the pulse PULSE1 is generated at the timing of the horizontal sync signal 21. That is, after the timing T13, the horizontal sync signal separation circuit is synchronous with the horizontal sync signal 21, and therefore, the separated horizontal sync signal $H_{syn}$ is also synchronous with the horizontal sync signal 21.

As can be seen from FIG. 3 and the above description, regardless of the timing by which the pulse PULSE1 is initially generated, the separated horizontal sync signal $H_{syn}$ is synchronized with the horizontal sync signal 21 no later than the point of time when the period during which there is no equalization pulse 22 in the composite sync signal $C_{sync}$ (i.e., the display period) starts.

The operation of this embodiment is further described with reference to FIG. 4. FIG. 4 shows signals of various parts of the horizontal sync signal separation circuit in FIG. 1, in a transition period from an even field to an odd field. In FIG. 4, the separated horizontal sync signal $H_{syn}$ is synchronized with the horizontal sync signal 21 in the even field. Therefore, in the even field, the pulse signal HED corresponding to the equalization pulse 22 does not pass through the AND gate 2 because the control signal TPF is LOW. The pulse signal HED corresponding to the horizontal sync signal 21 passes through the AND gate 2. The pulse signal HED that has passed through the AND gate 2 maintains the synchronizing condition between the horizontal sync signal separation circuit, and triggers the monostable multivibrator 5 to generate the separated horizontal sync signal $H_{syn}$. As shown in FIG. 4, the synchronizing condition between the separated horizontal sync signal $H_{syn}$ and the horizontal sync signal 21 is maintained even in the odd field. In this manner, according to this embodiment, the vertical sync signal and equalization pulse 22 can be removed from the composite sync signal $C_{sync}$, and the separated horizontal sync signal $H_{syn}$ synchronized with the horizontal sync signal 21 can be extracted alone.

Figure 5:
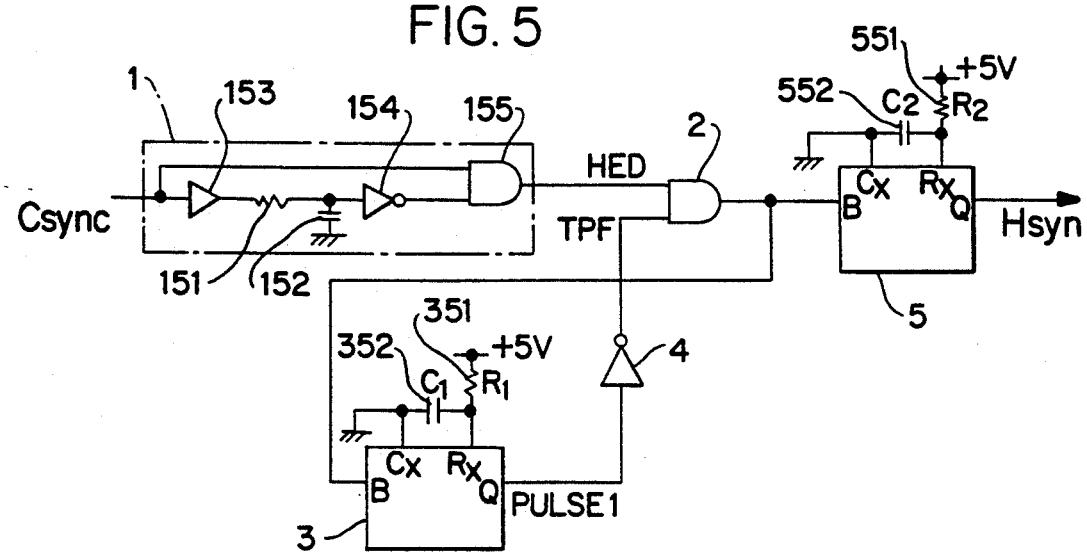
FIG. 5 is a circuit diagram showing a second embodiment of the invention.

FIG. 5 shows a second embodiment of the invention. In FIG. 5, components similar to those of the horizontal sync signal separation circuit in FIG. 1 are designated by the same reference numerals. In this embodiment, the rising edge detection circuit 1 uses a CR circuit comprising a resistor 151 and a capacitor element 152 in order to detect the rising edge of the composite sync signal $C_{sync}$. In addition to the CR circuit, the rising edge detection circuit 1 also comprises a buffer 153, an inverter 154 and an AND gate 155. The pulse width of the pulse PULSE1 output from the monostable multivibrator 3 is determined by the value $C_1.R_1$ obtained from the resistance $R_1$ of a resistor 351 and the capacitance $C_1$ of a capacitor 352 connected to the monostable multivibrator 3. Further, the pulse width of the separated horizontal sync signal $H_{syn}$ is determined by the value $C_2.R_2$ obtained from the resistance $R_2$ of a resistor 551 and the capacitance $C_2$ of a capacitor 552 connected to the monostable multivibrator 5.

Figure 6:
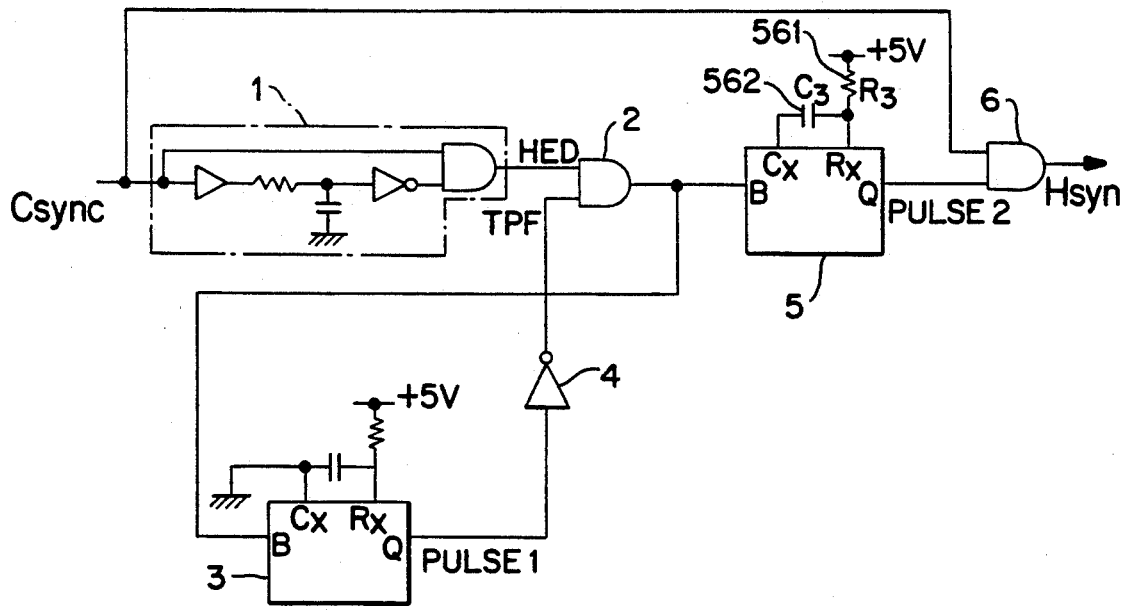
FIG. 6 is a circuit diagram showing a third embodiment of the invention.
Figure 7:
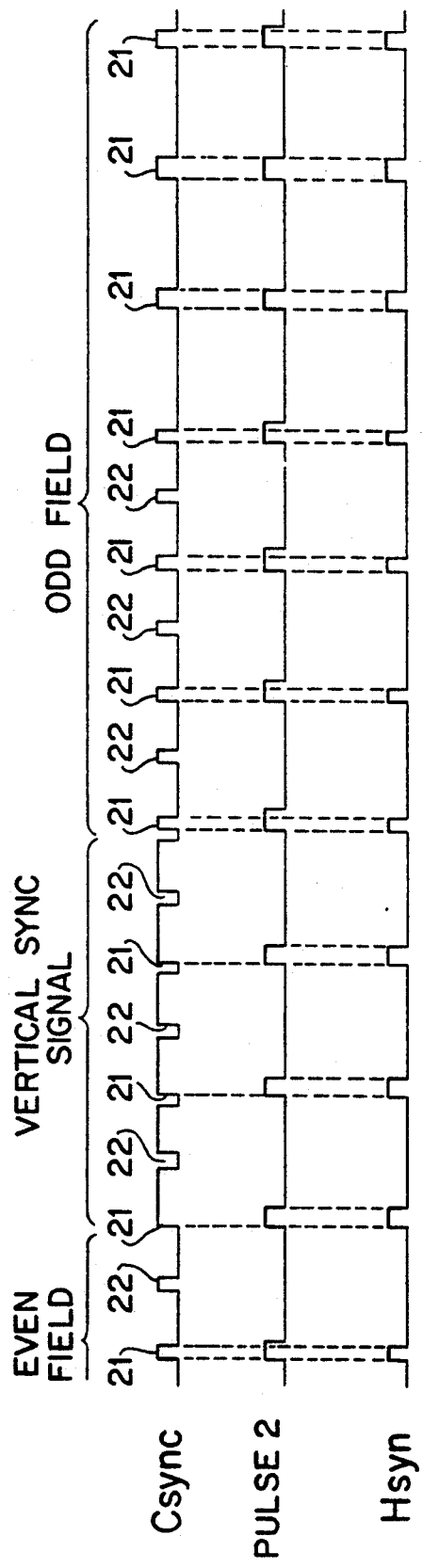
FIG. 7 is a timing chart illustrating the operation of the third embodiment of the invention.

FIG. 6 shows a third embodiment of the invention. In FIG. 6, components similar to those of the horizontal sync signal separation circuit in FIG. 1 are designated by the same reference numerals. In this embodiment, at the output side of the monostable multivibrator 5 is provided an AND gate 6 to which the pulse PULSE2 output from the monostable multivibrator 5 and the composite sync signal $C_{sync}$ are input. The output of the AND gate 6 is the separated horizontal sync signal $H_{syn}$. The pulse width of the pulse PULSE2 is made slightly larger than that of the horizontal sync signal 21 contained in the composite sync signal $C_{sync}$ by appropriately selecting the resistance $R_3$ of a resistor 561 and the capacitance $C_3$ of a capacitor 562 connected to the monostable multivibrator 5. Therefore, only the horizontal sync signal 21 contained in the composite sync signal $C_{sync}$ passes through the AND gate 6 in the period during which the pulse PULSE2 is output from the monostable multivibrator 5. As shown in FIG. 7, the pulse width of the horizontal sync signal 21 contained in the composite sync signal $C_{sync}$ is accurately reflected in the separated horizontal sync signal $H_{syn}$ in this embodiment, and a horizontal sync signal that is more faithful than in the circuit in FIG. 5 can be extracted.

Figure 8:
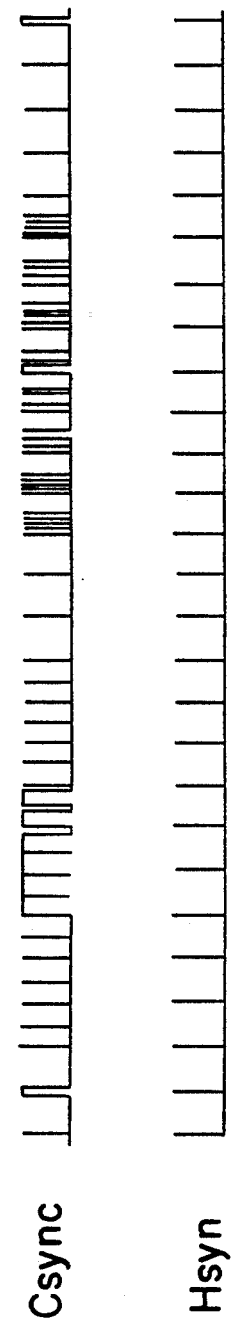
FIG. 8 is a timing chart showing a horizontal sync signal separated from a composite sync signal according to the invention.
Figure 11:
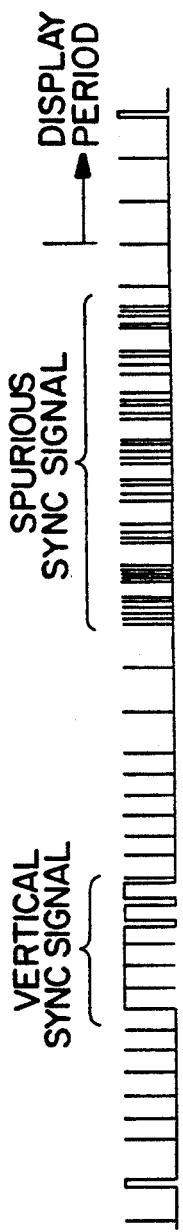
FIG. 11 shows a composite sync signal obtained from a video tape which was subjected to a duplication prevention process.

FIG. 8 shows a composite sync signal $C_{sync}$ into which a spurious sync signal similar to that in FIG. 11 is mixed, and the separated horizontal sync signal $H_{syn}$ obtained from this composite sync signal $C_{sync}$ by the horizontal sync signal separation circuit in FIG. 5. As can be seen from FIG. 8, the timing of the horizontal sync signal can be completely extracted according to the invention, even if the composite sync signal $C_{sync}$ is deformed by a spurious sync signal.

According to the invention, a horizontal sync signal separation circuit that can extract the timing of a horizontal sync signal from a composite sync signal is provided. The timing of the horizontal sync signal can be extracted in the same way, even if the composite sync signal contains an AGC signal for the luminance signal. The horizontal sync signal separated from the composite sync signal by the horizontal sync signal separation circuit of the invention at the timing of the horizontal sync signal may be used as the input of a PLL circuit. Therefore, a sampling clock signal can be obtained that is much more stable than in the case where the unchanged composite sync signal is used as the input to the PLL circuit, whereby a good, stable display can be attained in a matrix type display apparatus such as an LCD apparatus. A particularly good effect can be attained in the special effect playback of a video tape such as in fast forwarding and in the playback of a video tape which was subjected to a duplication prevention process. Furthermore, the output of the horizontal sync signal separation circuit can be used as the input of the PLL circuit for generating the sampling clock signal in a matrix type display apparatus, whereby the design of such PLL circuits can be more easily than that in the prior art.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A horizontal synchronizing signal separation circuit comprising:
   detection means, receiving a composite synchronizing signal which includes a horizontal synchronizing signal and a vertical synchronizing signal, for generating and outputting a detection signal of a predetermined width which is indicative of rising edges of the composite synchronizing signal;
   gate means, coupled to said detection means, for passing the detection signal in accordance with a control signal;
   control signal generation means, coupled to said gate means, for generating a pulse signal in accordance with an output of said gate means, rising edges of the pulse signal being delayed behind the rising edges of the composite synchronizing signal by at least the predetermined width, the pulse signal having a predetermined pulse width and being supplied toward said gate means in order to provide the control signal; and
   pulse signal generation means, coupled to said gate means, for generating a further pulse signal with rising edges substantially synchronized with the detection signal which passes through said gate means, the further pulse signal being output as a separated horizontal synchronizing signal.

2. The horizontal synchronizing signal separation circuit according to claim 1, wherein the predetermined pulse width is longer than a half of one horizontal scanning period and shorter than one horizontal scanning period.

3. The horizontal synchronizing signal separation circuit according to claim 1, wherein said control signal generation means comprises a monostable multivibrator.

4. The horizontal synchronizing signal separation circuit according to claim 3, wherein said control signal generation means further comprises an inverter which is connected to an output of said monostable multivibrator, an output of said inverter being output as the control signal.

5. The horizontal synchronizing signal separation circuit according to claim 1, wherein said pulse signal generation means comprises a monostable multivibrator.

6. The horizontal synchronizing signal separation circuit according to claim 3, wherein said control signal generation means further comprises a capacitor and a resistor, both of which are connected to said monostable multivibrator, the predetermined pulse width being controlled by varying a capacitance of said capacitor and a resistance of said resistor.

7. The horizontal synchronizing signal separation circuit according to claim 1, wherein the composite synchronizing signal additionally includes a spurious synchronizing signal, the predetermined pulse width including a period during which pulses of the spurious synchronizing signal exists.

8. A method of separating a horizontal synchronizing signal from a composite synchronizing signal which includes the horizontal synchronizing signal and a vertical synchronizing signal, the method comprising the steps of:
   generating a detection signal of predetermined width indicative of rising edges of the composite synchronizing signal;
   passing the detection signal through gate means in accordance with a control signal;
   generating a pulse signal in accordance with the detection signal passed through the gate means, rising edges of the pulse signal being delayed behind the rising edges of the composite synchronizing signal by at least the predetermined width, the pulse signal having a predetermined pulse width and being supplied to the gate means as the control signal; and
   generating a further pulse signal with rising edges substantially synchronized with the detection signal which passes through the gate means, the further pulse signal being output as a separated horizontal synchronizing signal.

9. The method of separating a horizontal synchronizing signal according to claim 8, wherein the predetermined pulse width is longer than a half of one horizontal scanning period and shorter than one horizontal scanning period.

10. The method of separating a horizontal synchronizing signal according to claim 8, wherein said step of generating a pulse signal comprises a step of inputting the detection signal passed through the gate means into monostable multivibrator means to generate the pulse signal,
    the method further comprising a step of inverting the pulse signal to generate the control signal.

11. The horizontal synchronizing signal separation circuit according to claim 1, further comprising inverting means, the pulse signal being inverted by said inverting means, the inverted pulse signal being supplied to said gate means as the control signal.

* * * * *